(12) United States Patent
Kim

(10) Patent No.: US 7,214,048 B2
(45) Date of Patent: May 8, 2007

(54) VALVE GATE ASSEMBLY FOR INJECTION MOLDING MACHINE

(76) Inventor: Hyuk Joong Kim, #112-1802, Hyundai I-PARK Deungchon-Dong 715, Gangseo-Gu, Seoul (KR) 134-060

( * ) Notice: Subject to any disclaimer, the term of this patent is extended or adjusted under 35 U.S.C. 154(b) by 365 days.

(21) Appl. No.: 10/853,648

(22) Filed: May 24, 2004

(65) Prior Publication Data

US 2005/0123641 A1    Jun. 9, 2005

(30) Foreign Application Priority Data

Dec. 9, 2003    (KR)    ............ 10-2003-0089018

(51) Int. Cl.
*B29C 45/23*    (2006.01)
(52) U.S. Cl. .................. 425/145; 425/564; 425/566

(58) Field of Classification Search ............. 425/562, 425/563, 564, 565, 566, 145
See application file for complete search history.

(56) References Cited

U.S. PATENT DOCUMENTS

2005/0100625 A1*    5/2005    Tooman et al. ............. 425/564

* cited by examiner

*Primary Examiner*—Tim Heitbrink
(74) *Attorney, Agent, or Firm*—Darby & Darby

(57) ABSTRACT

Disclosed is a valve gate assembly for an injection molding machine. By controlling a valve pin through a linear motor controlled by a pulse signal and through a cooling block, an opening/closing amount of a gate can be precisely managed. Thereby, a mold is increased in quality and efficient management is possible when the valve gate assembly is applied to a multiple cavity matallic mold.

4 Claims, 10 Drawing Sheets

PRIOR ART

PRIOR ART

CLOSE ←——————→ OPEN

VALVE GATE ASSEMBLY FOR INJECTION MOLDING MACHINE

This application claims the priority of Korean Patent Application No. 10-2003-0089018 filed Dec. 9, 2003.

FIELD OF THE INVENTION

The present invention relates to a valve assembly for an injection molding machine, and more particularly to a valve gate assembly for an injection molding machine, suitable to precisely control an opening/closing amount of a gate and simultaneously to mass-produce a mold.

BACKGROUND OF THE INVENTION

Generally, the valve assembly for the injection molding machine is for injecting a liquid resin into a cavity of a metallic mold, wherein the liquid resin is supplied from a cylinder (also referred to as an extruder) in which a resin is molten. The valve assembly is designed to open or close a gate by a upward or downward movement of a valve pin, and is generally classified into two types: manifold and cylinder, according to the number of parts (or molds) molded at a time wherein the manifold type is used to mold multiple molds from the liquid resin supplied through a manifold, while the cylinder type is used to mold a single mold from the liquid resin supplied through a cylinder.

FIG. 1 is a cross-sectional view showing a valve gate assembly for a conventional injection molding machine (U.S. Pat. No. 6,343,925/HOT RUNNER VALVE GATE PISTON ASSEMBLY). As shown, the valve gate assembly is generally comprised of a driver 100 and a valve body 200. As a driving power source for an upward or downward movement of a valve pin 210, high-pressure air is used.

Specifically, the driver 100 is provided with a plurality of air passageways or channels 110 and 120 for supplying and discharging the high-pressure air from/toward an outside. An air piston 140 in an cylinder 130 ascends or descends through the plurality of channels 110 and 120. A valve pin 210 is cooperatively coupled to a lower end of the piston 130. Thus, the valve pin 210 is raised or lowered with the piston 130, and thereby a gate 220 of the valve body 200 is selectively closed or opened.

Meanwhile, the valve body 200 is provided with a resin channel 230 which is spaced around the valve pin 210. The resin channel 230 is connected with the gate 220 on one end and with a resin channel 310 of a manifold 300 on the other end.

In the valve gate assembly for the injection molding machine constructed in this manner, when the high-pressure operation air is selectively supplied to the air channels 110 and 120, the piston 140 is raised or lowered. Simultaneously, the valve pin 210 is also raised or lowered. Therefore, raising or lowering of the piston 140 causes the gate 220 to be opened or closed. Eventually, the resin, which has been supplied through the manifold 300, is either supplied through the gate 220 to a metallic mold or blocked.

To sum up, the valve gate assembly for the conventional injection molding machine operated by the air pressure supplies the high-pressure air through the selected air channel 110 or 120 to the cylinder 130, thereby raising or lowering the piston 140. In cooperation with the piston 140, the valve pin 210 opens or closes the gate 220.

However, the conventional valve gate assembly constructed as above makes use of the air as the operation source for raising or lowering the valve pin 210. As a result, there is a problem in that it has a slow responsibility and a low reliability on operation. Particularly, an airtight structure must be employed in order to prevent the high-pressure air, the operation source, from leaking out. This incurs another problem in that the assembly has an increased entire volume and a complicated structure, so that it is considerably restricted in installation space. Consequently, a degree of freedom in design of metallic molds is limited as well as maintenance and management are not easy.

In order to these problems, a valve assembly is proposed as shown in FIG. 2, which is electrically powered to generate a driving force, and thus actuating a valve pin.

Looking at a configuration of an electrically powered valve assembly as shown in FIG. 2, it is generally comprised of a valve body 500 and a driving means 600. The valve body 500 has a structure of a typical valve body, which is provided with a resin channel 510 for injecting a resin into a metallic mold through a gate formed at a leading end of the valve body, wherein the resin is supplied from a resin channel 710 formed in a manifold 700.

The driving means 600 is designed to include an actuator for raising and lowering a valve pin 530 through supply of power. The actuator is configured in such a manner that first and second tubular electromagnets 610 and 620 are vertically disposed at a distance apart from each other and selectively generate a magnetic force, and a core 630 magnetized by the magnetic force is installed between the electromagnets 610 and 620. Here, the core 630 is supported by an elastic spring 640 for restoring the valve pin on its upper surface.

The valve assembly of the electrically powered valve assembly constructed in this manner can be made in a small size by employing the actuator as the driving source, so that it is possible not only to increase a degree of freedom in design of metallic molds, but also to rapidly and precisely control a movement amount of the valve pin.

However, because the valve assembly of the electrically powered valve assembly employs the actuator as the driving source, it has disadvantages in that an opening/closing amount of the gate can not be controlled, and that an ambient temperature is high during injection molding, components, such as a coil and circuitry, constituting the actuator is deteriorated, and thus there is a need for frequent repairs, which results in a lowered reliability. Particularly, in the case that the valve assembly is applied to a metallic mold capable of molding a plurality of molds at a time, it is not easy to perform exchange or repair of the driving source, so that workability and productivity are decreased.

SUMMARY OF THE INVENTION

Accordingly, the present invention has been made to solve the above-mentioned problems occurring in the prior art, and an objective of the present invention is to provide a valve gate assembly for an injection molding machine, capable of precisely controlling linear reciprocation of a valve pin without a separate circuit or a speed reducer, thereby enhancing a degree of freedom in an injection molding operation and being easily applied to mass-produce a mold In order to accomplish this objective, there is provided a valve gate assembly for an injection molding machine comprising: a valve body disposed on a lower surface of a manifold for supplying a resin to receive the resin, designed to prevent rotation of a valve pin for opening/closing a gate by means of raising/lowering operation in an inner middle of the valve body, and provided with a thread on an outer circumferential surface of an upper end of the valve pin; a linear motor disposed upside the manifold, having a tubular rotor for providing raising/lowering force to the valve pin of the valve body and for generating rotation by means of supplied power, and controlled by a pulse signal for linear movement up and down in cooperation with the valve pin when the rotor performs forward/reverse rotation, wherein an inner circumferential surface of the rotor is screwed with the upper end of the valve pin; and a cooling block provided between the manifold and the linear motor, having at least one cooling water channel circulating cooling water inside, and formed as a plate shaped member for blocking heat transmission.

According to one feature, the linear motor includes: a tubular stator having a case and a coil provided and wound in the case; a rotor rotatably mounted on an inner circumferential surface of the stator with an air gap maintained, provided with a thread on an inner circumferential surface thereof, and formed of a tubular magnet; and a potentiometer connected to the rotator on one end and detecting a rotation amount of the rotor.

According to another feature, the valve pin is divided into at least two parts, and the two parts are connected by a thermal isolating coupler.

According to yet another feature, the linear motor is covered by a cooling housing having a plurality of cooling water channels through which the cooling water flows and a coupling pipe for connecting the cooling channels so that the cooling water is circulated along the connected cooling channel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
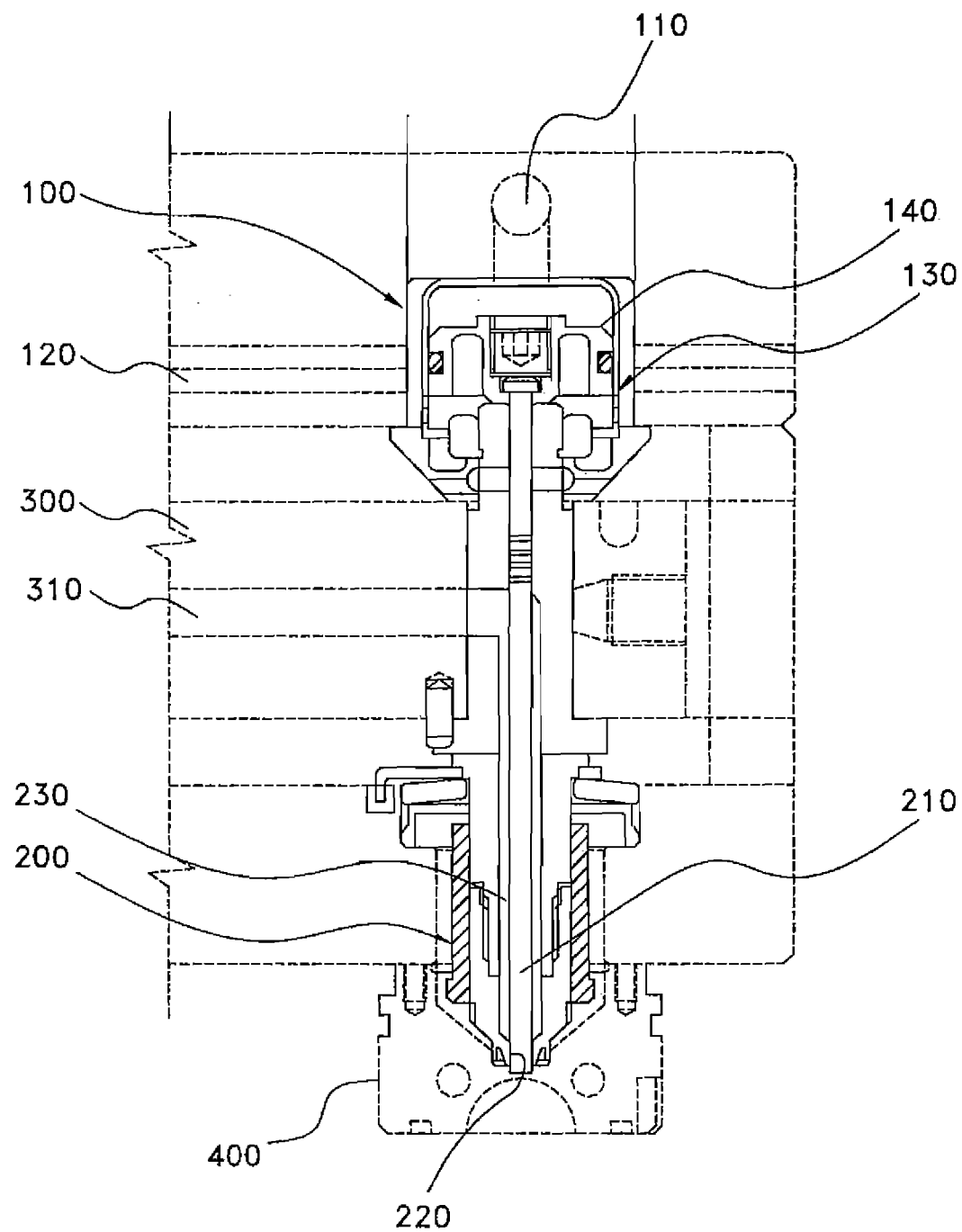
FIGS. 1 and 2 are cross-sectional views showing a valve gate assembly for a conventional injection molding machine.
Figure 2:
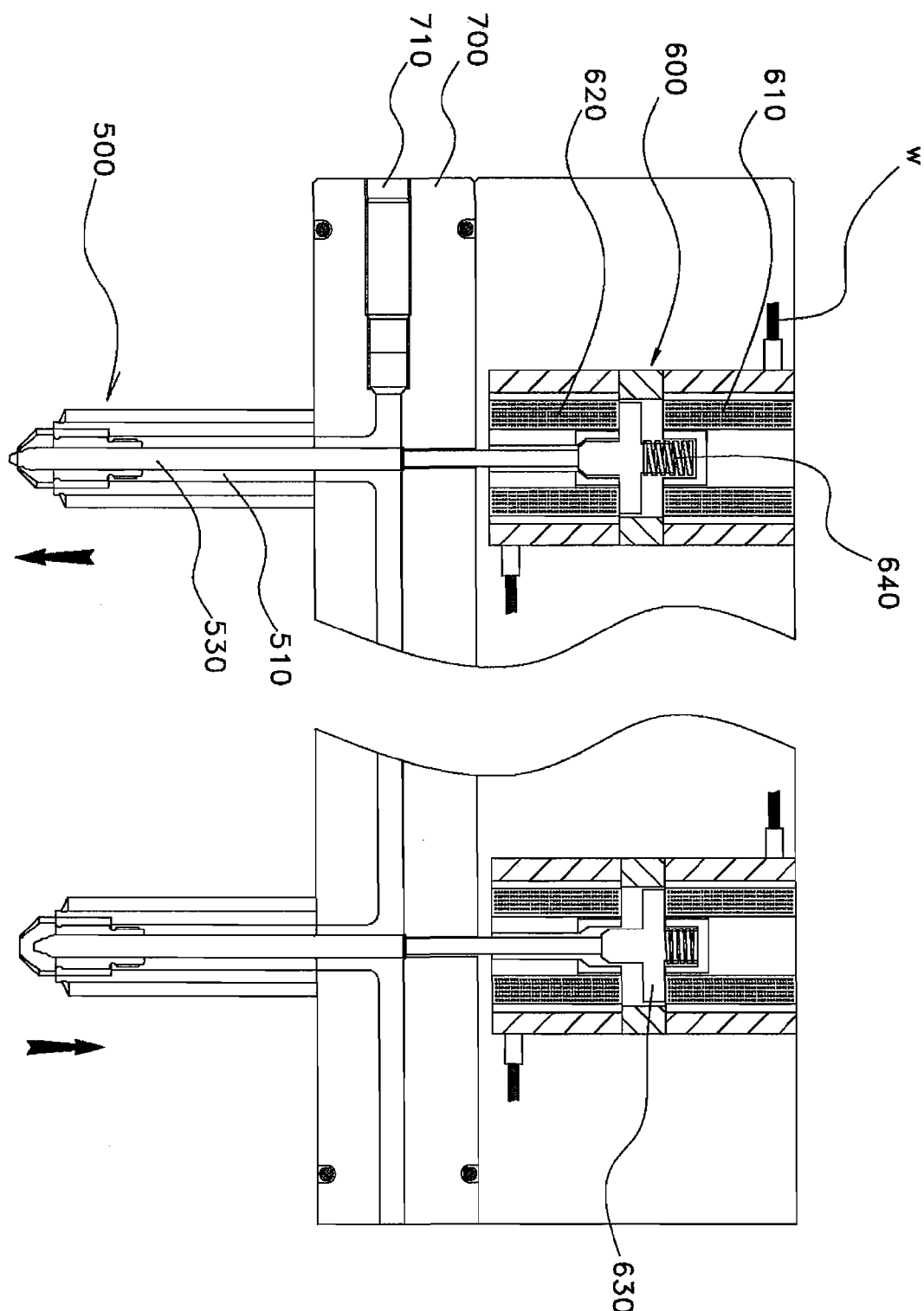

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
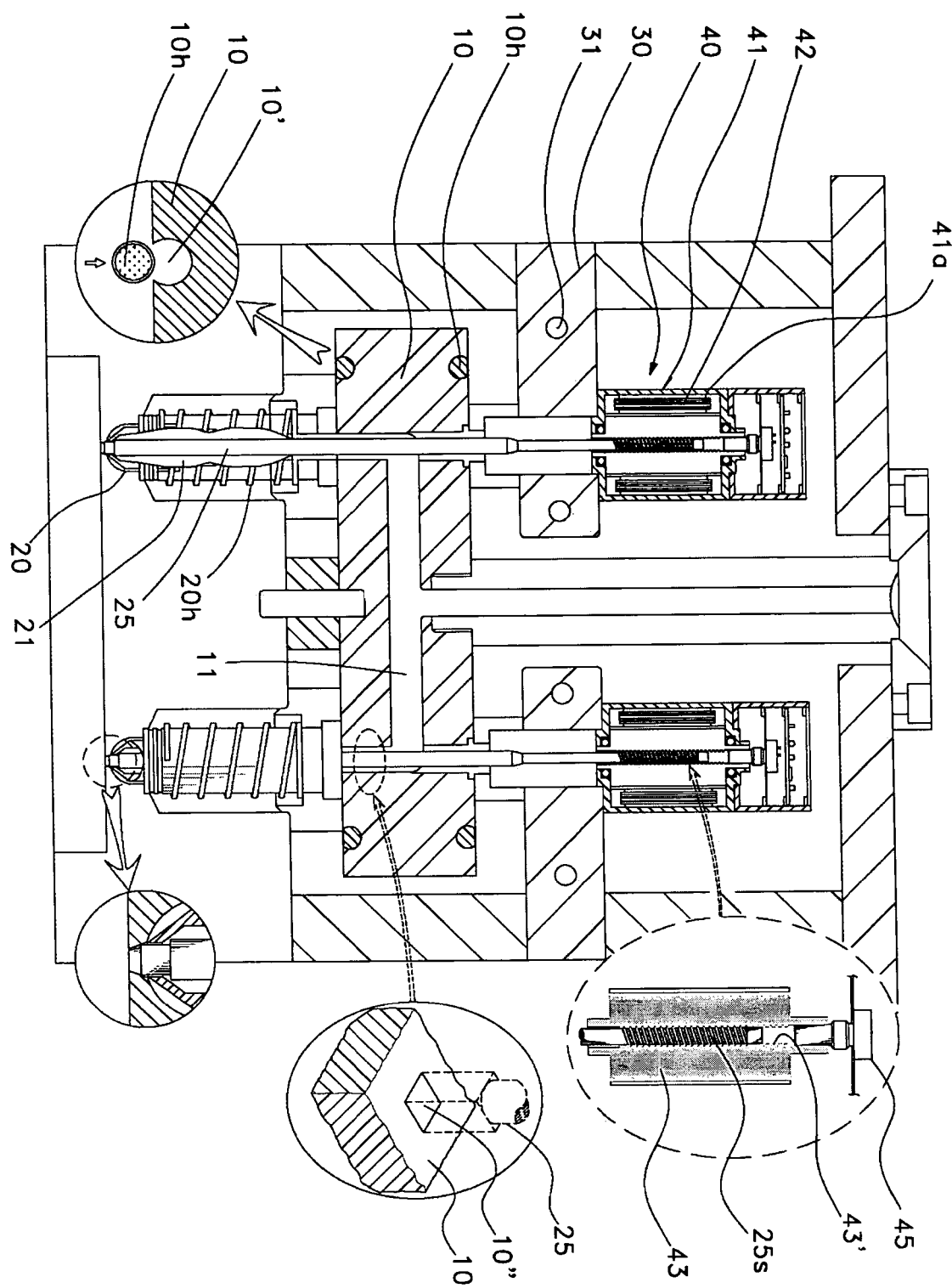
FIGS. 3 and 4 are cross-sectional views showing one embodiment of a valve gate assembly for an injection molding machine according to the present invention.
Figure 4:
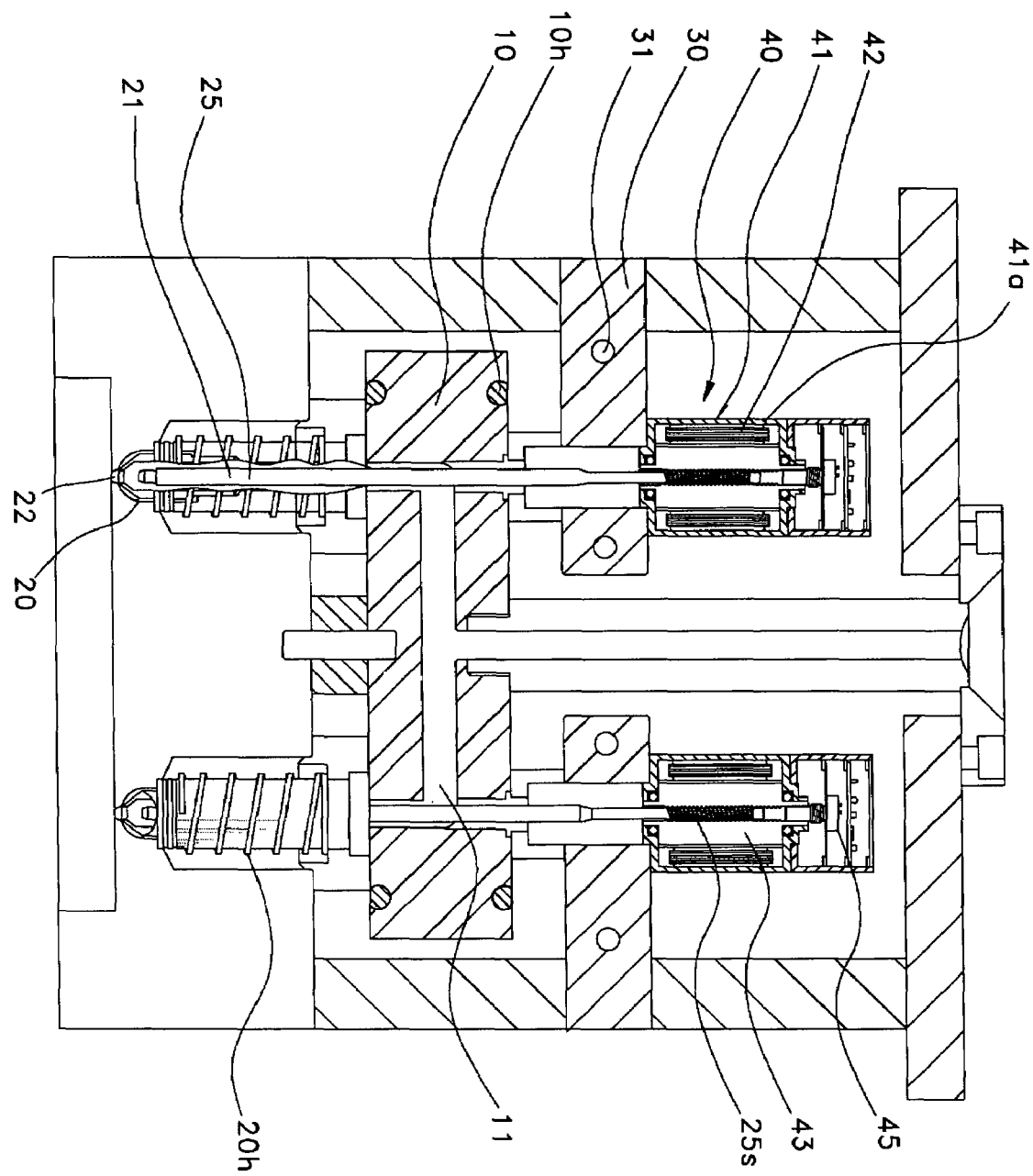

FIGS. 3 and 4 show one embodiment of a valve gate assembly of an injection molding machine according to the present invention. As shown, the valve gate assembly is generally comprised of a manifold 10, a valve body 20, and a driving means 40 for raising or lowering a valve pin 25.

The manifold 10 is formed of a metallic member substantially having a plate shape. The manifold 10 is provided with a resin channel 11 along which a liquid resin runs inside thereof, and a heater wire 10*h*, a heating element, fitted into a mounting circular groove 10' by a forging process on upper and lower surface thereof, wherein the heater prevents the liquid resin running along the resin channel 11 from be solidified. The manifold 10 is mounted to the valve body 20 on the lower surface thereof, and to the driving means 40 for raising or lowering the valve pin 25 on the upper surface thereof.

The valve body 20 is a long tube-shaped member, which is formed with a resin channel 21 along the inner middle thereof. The resin channel 21 is communicated with a gate 22 which is formed on a leading end of the valve body 20. The gate 22 is connected to one end of a metallic mold, even if not shown, for molding injection molds. A heater wire 20*h* is wound on an outer circumferential surface of the valve body 20 in order to prevent solidification of the resin running through the resin channel 21.

The valve body 20 is provided with the valve pin 25 having an outer diameter smaller than an inner diameter of the resin channel 21, which is formed along the middle of the valve body 20, and is adapted to allow the resin to flow around the valve pin 25. Here, the valve pin 25 functions to open/close the gate 22 by the raising/lowering operation, whose upper end passes through the manifold 10 to be connected to the driving means 40. In other words, as shown in FIGS. 3 and 4, the valve pin 25 takes a cylindrical shape as a whole, whose leading end is designed to come into close contact with an inner diameter portion of the gate 22 so as to selectively block the gate 22 of the valve body 20, and whose rear end (upper side in the figure) is provided with a thread 25*s* screwed with a rotor in the driving means 40. Further, the valve pin 25 has an anti-rotation structure, for which one end of the valve pin 25 is formed in an angled shape, and the corresponding through hole through which the angled portion passes is also formed in the angled shape. For example, as shown in FIG. 3, one hole 10" of the manifold 10 through which the valve pin 25 passes is formed in a rectangular shape, and the valve pin 25 pass through the one hole 10" is also formed in the rectangular shape. As a result, it is possible to prevent rotation. Thus, considering that the present invention has a structural feature capable to preventing rotation during raising/lowering movement of the valve pin, it will do that the anti-rotation structure of the valve pin may be variously modified.

The driving means 40 is characterized by a linear motor and a cooling block for radiating heat of the linear motor, wherein the linear motor rotates at a specified angle without feedback for detecting a position of an output shaft, makes a stop in considerably high precision, holds a very great holding torque when making a stop compared with other typical motors, and has a rotational speed proportional to a pulse rate.

In other words, the linear motor 41 may make use of a precisely controllable stepping motor or servo motor. The linear motor 41 is characterized in that it can be precisely controlled by a control signal or pulse in a digital manner. Thus, the linear motor 41 can adjust an opening/closing amount of the gate 22 by delicately controlling the movement amount of the valve pin 25.

As shown in FIGS. 3 and 4, the linear motor 41 is disposed upside of the manifold 10 via the cooling block 30, and includes a tubular rotor which is basically rotated by pulse signal input. Specifically, the linear motor is generally divided into a stator 42 and a rotor 43, wherein the stator 42 is composed of a case 41a forming an outer body, and a coil 41b provided in the case 41a, and wherein the rotor 43 is arranged at an air gap from an inner circumferential surface of the coil 41b to generate an electromagnetic force by interaction, which makes use of a tubular magnet having N and S poles magnetized alternately along its outer circumferential surface, and is provided with a female thread 43' on its inner circumferential surface, thus being screwed with the male thread 25s of the valve pin 25.

A potentiometer 45 is disposed upside the linear motor 41 and supported by a bracket. The potentiometer 45 is for sensing the movement amount of the valve pin 25 based on the rotation amount of the rotor 43 using a precise variable resistor, which is widely adopted for the typical control mode of motors, and thus its detailed description will be omitted. Meanwhile, while the present invention has proposed the potentiometer as means for controlling a position in the motor, an encoder or other sensor may be used as long as it is capable of detecting the rotation amount or position in the motor.

The linear motor 41 constructed as above-mentioned is designed so that when a current is applied to the coil 41b, the electromagnetic force is generated between the coil 41b and the magnet. In this case, the electromagnetic force causes the magnet as the rotor 43 to rotate about the stator 42 in a forward or reverse direction. Therefore, because the valve pin 25 screwed with the inner circumferential surface of the rotor 43 has the anti-rotation structure, the rotational force of the rotor 43 causes the valve pin 25 to linearly move up and down along the female thread 43'.

As long as the linear motor 41 is characterized by rotating at a constant angle according to the control signal, it may be variously modified in form or size. In other words, the linear motor 41 applied to the present invention has a driving principle equal to that of a typical stepping motor, and is characterized by a driving mode in which the rotation of the constant angle occurs as an external DC voltage or current is inputted into each phase terminal of the motor in a pulse form and in a switching mode.

Meanwhile, when an ambient temperature is too high, the linear motor 41 decreases efficiency as well as reliability caused by malfunction. For this reason, the cooling block 30 is provided between the linear motor 41 and the manifold 10, so that the heat generated from the manifold 10 and valve body 20 is kept from being transmitted to the driving means 40.

Figure 10:
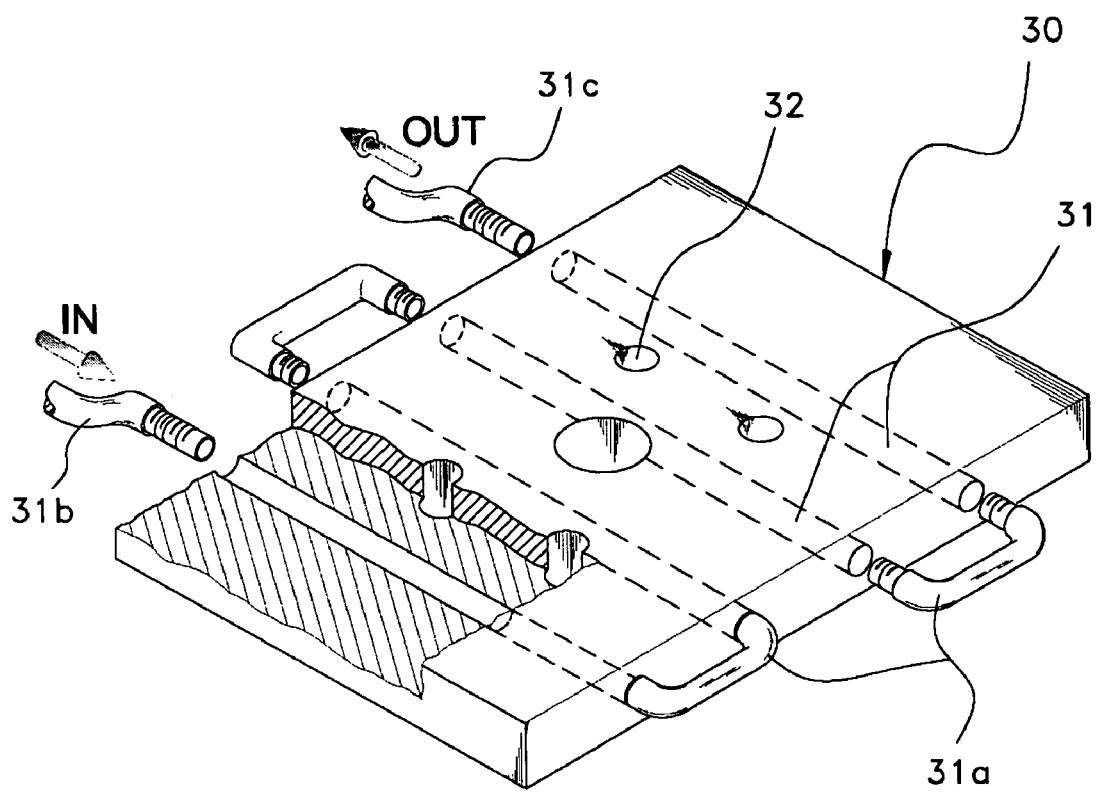
FIG. 10 is a perspective view showing a cooling block of FIG. 4.

The cooling block 30 is preferably formed of a metallic member, which has a plate shape substantially and an excellent heat-radiating effect. As shown in FIG. 10, the cooling block 30 is provided with a plurality of cooling water channels 31 through which cooling water flows and which are spaced at a uniform interval. The cooling water channels 31 are coupled by coupling pipe 31a in such a manner that the cooling water circulates an entire cooling block along the cooling water channels. Here, a reference numeral 32 indicates a through hole through which one end of the valve pin 25 passes, and 31b and 31c indicate a supply pipe and a discharge pipe for supplying and discharging the cooling water from/toward the exterior, respectively.

Hereinafter, an operation of the valve gate assembly for the injection molding machine constructed as set forth above in accordance with the present invention will be described with reference to FIGS. 3, 4 and 11.

FIG. 3 shows either an inactive state where the injection molding machine is not operated or an active state where the gate 22 is closed by a holding torque of the linear motor 41. In the case of opening the gate 22 of the valve body 20 in this state, a control signal is inputted into the linear motor 41. Then, the magnet or rotor 43 rotates in one direction, and the rotation of the magnet causes the thread 25s of the valve pin 25 coupled on the inner circumferential surface of the magnet to linearly move along the thread 43' of the rotor 43 in an upward direction. Therefore, as the valve pin 25 moves in the upward direction, the gate 22 of the valve body 20 is opened as in FIG. 4. In this state, a resin supplied through the manifold 10 can be injected into an exterior, i.e., a metallic mold through the gate 22.

Subsequently, in the case of closing the gate 22 of the valve body 20, when a control signal for reverse rotation is inputted into the linear motor 41, the magnet or rotor 43 performs reverse rotation. Then, the reverse rotation of the magnet causes the valve pin 25 coupled on the inner circumferential surface of the magnet to linearly move down along the thread 43' of the rotor 43. Eventually, the gate 22 of the valve body 20 is closed as in FIG. 3. In this state, the linear motor 41 maintains a stop state without a separate break device due to its own holding torque, thus safely preventing withdrawal of the valve pin 25 caused by reverse flow of the resin injected into the metallic mold.

Meanwhile, the cooling block 30 keeps heat radiated from the manifold 10 and valve body 20 from being transmitted to the motor as the cooling water is circulated along the cooling water channels 31 during the above-mentioned operation.

Figure 11:
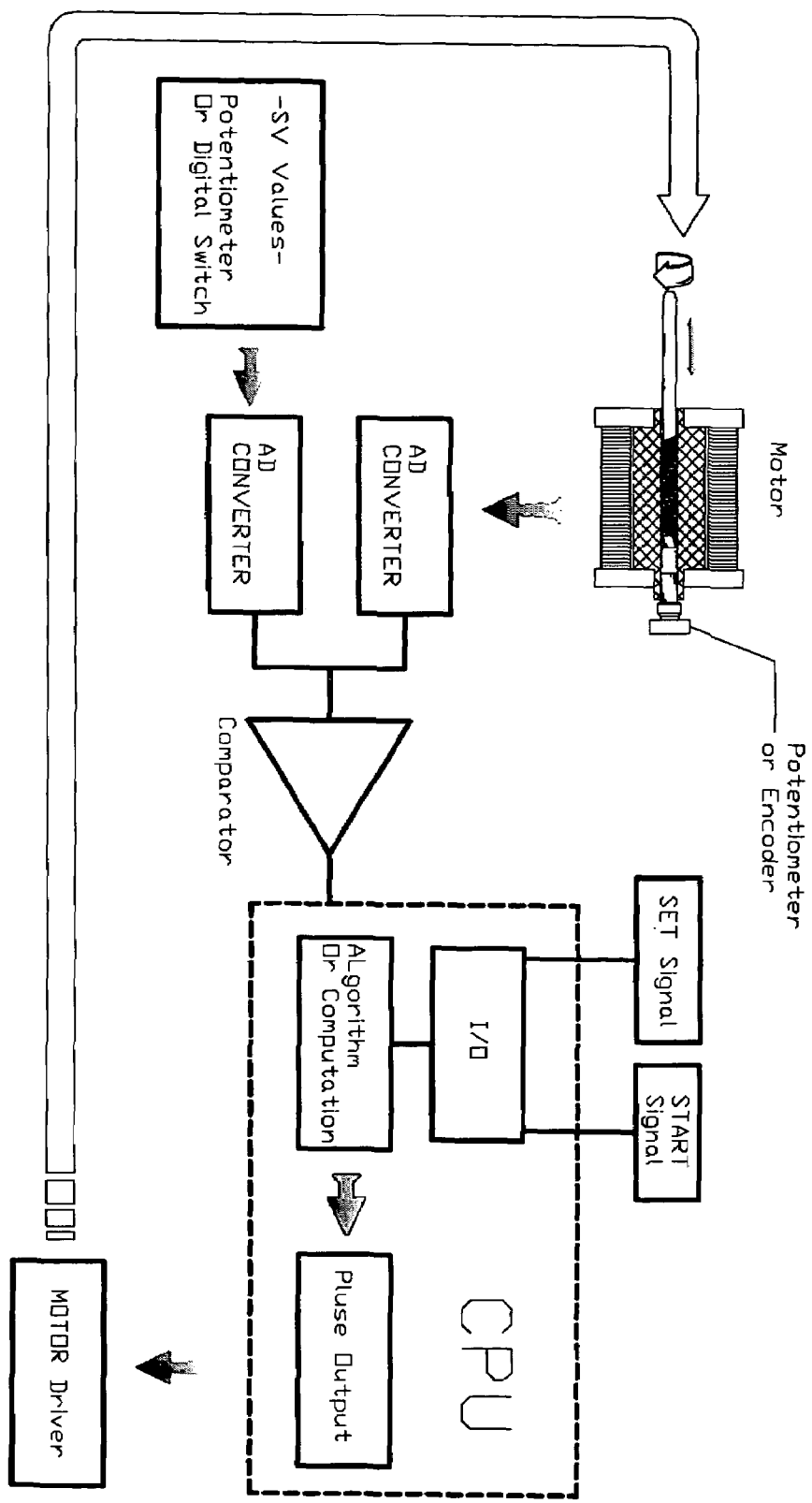
FIG. 11 is a block diagram conceptually showing an operation of a valve gate assembly for an injection molding machine according to the present invention.

Further, FIG. 11 conceptually shows a control structure of a linear motor. When the linear motor is operated, the potentiometer detects a movement amount of the valve pin based on a rotation amount of the rotor and applies the detected result to a central processing unit (CPU). Then, the CPU calculates current position, movement speed etc. of the valve pin based on the detected signal, and performs application of a proper control signal to the linear motor and control of the linear motor. Here, the CPU includes an I/O circuit, an algorithm or computation circuit, and a pulse output circuit.

Figure 7:
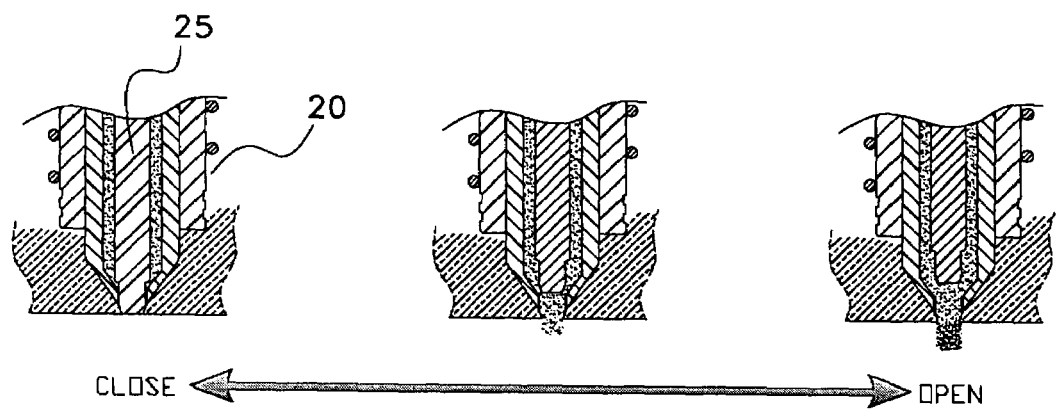
FIG. 7 is a cross-sectional view conceptually showing an opening/closing amount based on movement of a vale pin in a valve gate assembly for an injection molding machine according to the present invention.

As set forth above, the valve gate assembly for the injection molding machine of the present invention is characterized in that the gate can be opened or closed by the linear motor and that an opening/closing amount of the gate can be arbitrarily adjusted as in FIG. 7. In other words, the valve gate assembly for the injection molding machine of the present invention can independently control the positions of the valve pins for each valve gate when being applied to a multiple cavity matallic mold.

Figure 5:
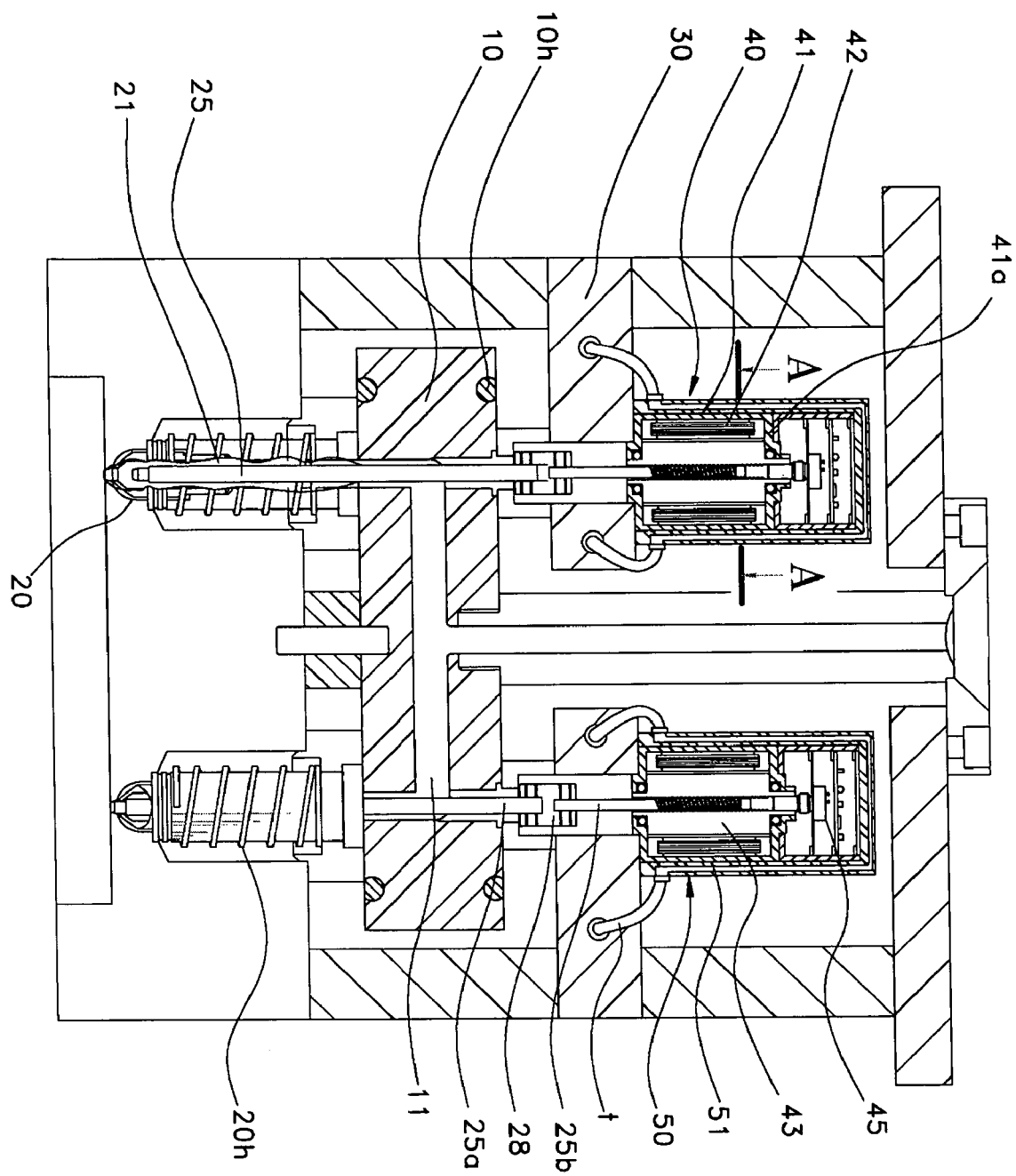
FIGS. 5 and 6 are cross-sectional views showing another embodiment of a valve gate assembly for an injection molding machine according to the present invention.
Figure 6:
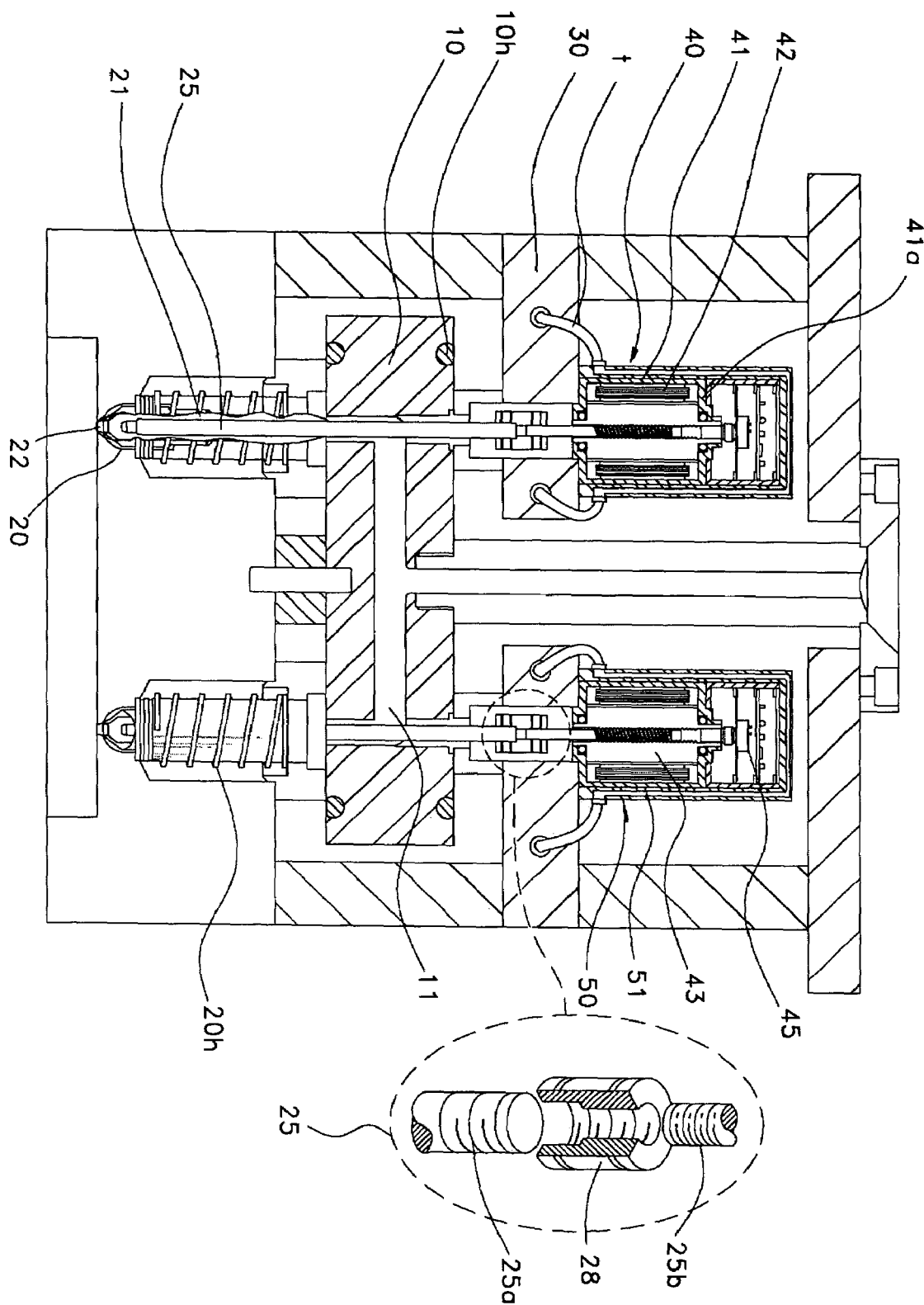
Figure 8:
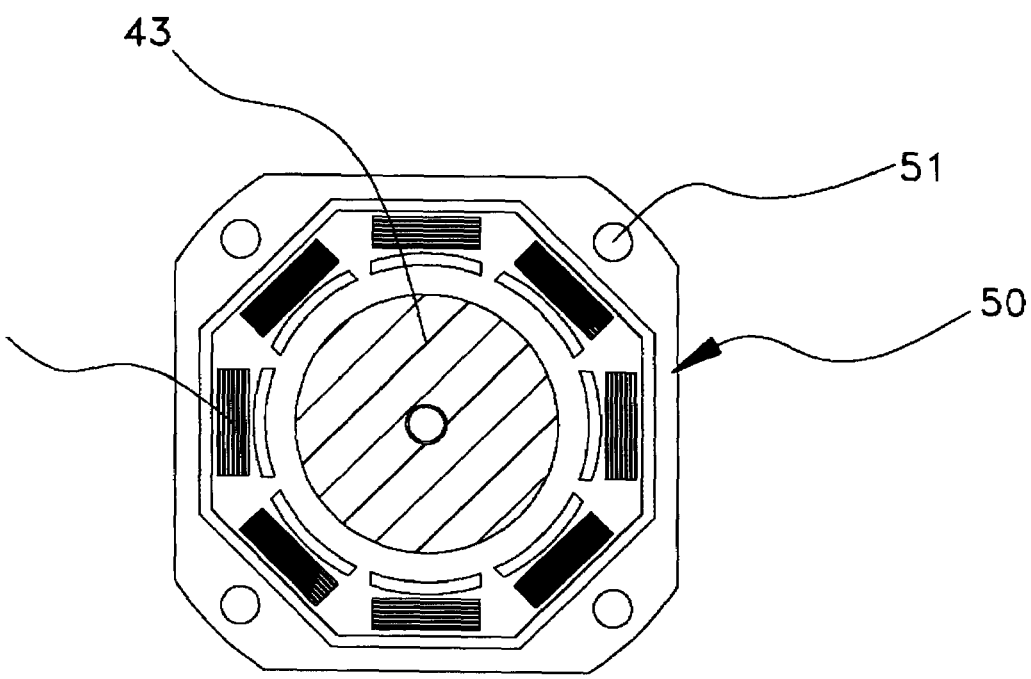
FIG. 8 is a cross-sectional view taken along the lines A—A of FIG. 4.
Figure 9:
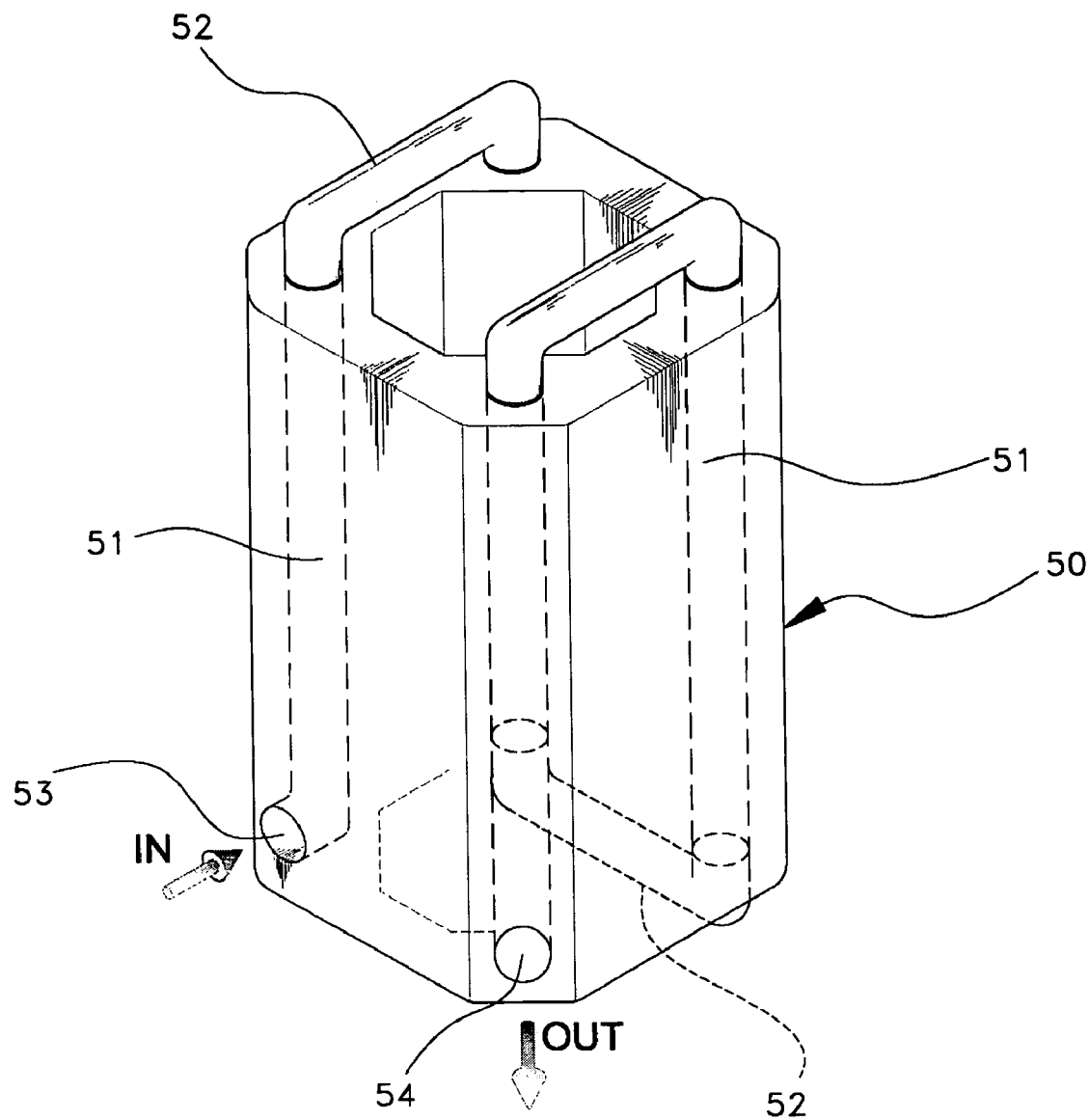
FIG. 9 is a perspective view showing a cooling housing of the motor of FIG. 4.

FIGS. 5 and 6 are cross-sectional views showing another embodiment of a valve gate assembly for an injection molding machine according to the present invention, FIG. 8 is a cross-sectional view taken along the lines A—A of FIG. 4, and FIG. 9 is a perspective view showing a cooling housing of the motor of FIG. 4. As shown, the another embodiment of the present invention includes a cooling housing and a thermal isolating coupler, wherein the cooling housing is mounted to cover an outer circumferential surface of a linear motor as an electrical device and cools off the linear motor directly, and wherein the coupler blocks heat from being transmitted to the linear motor via a valve pin.

In other words, the cooling housing 50 designed to surround a case 41c of the linear motor 41 is provided with a plurality of cooling water channels 51 through which cooling water flows at four corners as shown in FIG. 9. Each cooling water channel 51 is connected by a coupling pipe 52 so that the cooling water moves in a circulating manner. The connected cooling water channel 51 is provided with an inlet port 53 and an outlet port 54 through which the cooling water is introduced and discharged, and is connected to the cooling block 30 as shown in FIGS. 5 and 6. The cooling housing 50 constructed in this manner cools off the linear motor 41 as the cooling water is circulated along the connected cooling channel 51.

The thermal isolating coupler 28 is integrally connected between two divisions into which the valve pin 25 is divided. Specifically, as a high-temperature resin flows around the valve pin 25, the valve pin 25 is maintained in a high temperature state. In order to prevent heat of the valve pin 25 from being transmitted to the linear motor 41, the valve pin 25 is configured to make use of the coupler 28. In other words, the thermal isolating coupler 28 is formed of a material having a low thermal conductivity, and divides the valve pin 25 into lower and upper valve pins 25a and 25b as shown in FIG. 5. The lower valve pin 25a is a portion for opening/closing the gate 22, while the upper valve pin 25b is a portion provided with the thread 25s. The divided lower and upper valve pins 25a and 25b are designed to be screwed with the coupler 28.

Meanwhile, as long as the thermal isolating coupler 28 has a characteristic capable of interrupting the heat of the high-temperature valve pin 25 from being transmitted to the linear motor, the coupler 28 may be variously modified in coupling structure, geometry or material.

A reference numeral t, not described, is a tube for connecting the cooling water channel 31 of the cooling block 30 and the connected cooling water channel 51 of the cooling housing 50. The cooling water circulates the cooling block and the cooling housing by means of the tube.

The valve gate assembly for the injection molding machine constructed as above-mentioned in accordance with another embodiment of the present invention is designed so that the valve pin 25 is raised or lowered to open or close the gate 22 by means of the same operation as the above-mentioned one embodiment. However, there is a difference between two embodiments in that the linear motor 41 and potentiometer 45 are cooled off by the cooling housing 50 and the thermal isolating coupler 28.

The valve gate assembly for the injection molding machine constructed and operated as above-mentioned employs the linear motor. As a result, it is not necessary to additionally mount a separate speed reducer, an electronic break etc. which are considered to be drawbacks of a general injection molding machine of the conventional motor type, so that it is possible not only to simplify the configuration but also to precisely control the opening/closing amount of the gate, and thus it is possible to guarantee reliability of the machine and to enhance quality of the molds. Moreover, when it is applied to a system for mass-production of molds, it is possible to individually manage the opening/closing amount of each gate in precision. Thus, although the resin flows non-uniformly due to assembling deviation of the manifold and other components, the opening/closing amounts of the gates can be independently controlled, and thus a uniform quality of molds can be mass-produced. In addition, it is possible to enhance a degree of freedom in the injection molding operation and simultaneously to simplify the structure, so that it is possible to remarkably improve ease of maintenance, workability and productivity.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A valve gate assembly for an injection molding machine comprising: a valve body disposed on a lower surface of a manifold for controlling a flow of resin to a mold cavity, said valve body having a valve pin for opening/closing a gate by means of a raising/lowering operation said valve pin being provided with a thread on an outer circumferential surface of an upper end of the valve pin; a linear motor disposed upside the manifold, having a tubular rotor for providing raising/lowering force to the valve pin of the valve body and for generating rotation by means of supplied power, and controlled by a pulse signal for linear movement up and down in cooperation with the valve pin when the rotor performs forward/reverse rotation, wherein an inner circumferential surface of the rotor is screwed with the upper end of the valve pin; and a cooling block provided between the manifold and the linear motor, having cooling water channel circulating cooling water inside, and formed as a plate shaped member for blocking heat transmission.

2. The valve gate assembly as claimed in claim 1, wherein the linear motor includes: a tubular stator having a case and a coil provided and wound in the case; a rotor rotatably mounted on an inner circumferential surface of the stator with an air gap maintained, provided with a thread on an inner circumferential surface thereof, and formed of a tubular magnet; and a potentiometer connected to the rotor on one end and detecting a rotation amount of the rotor.

3. The valve gate assembly as claimed in claim 1, wherein the valve pin is divided into at least two parts, and the two parts are connected by a thermal isolating coupler.

4. The valve gate assembly as claimed in claim 1, wherein the linear motor is covered by a cooling housing having a plurality of cooling water channels through which the cooling water flows and a coupling pipe for connecting the cooling channels so that the cooling water is circulated along the connected cooling channel.

* * * * *